Dec. 24, 1957    J. SHLECHTER    2,817,332
ORTHOPTIC SPECTACLES
Filed May 10, 1955    2 Sheets-Sheet 1
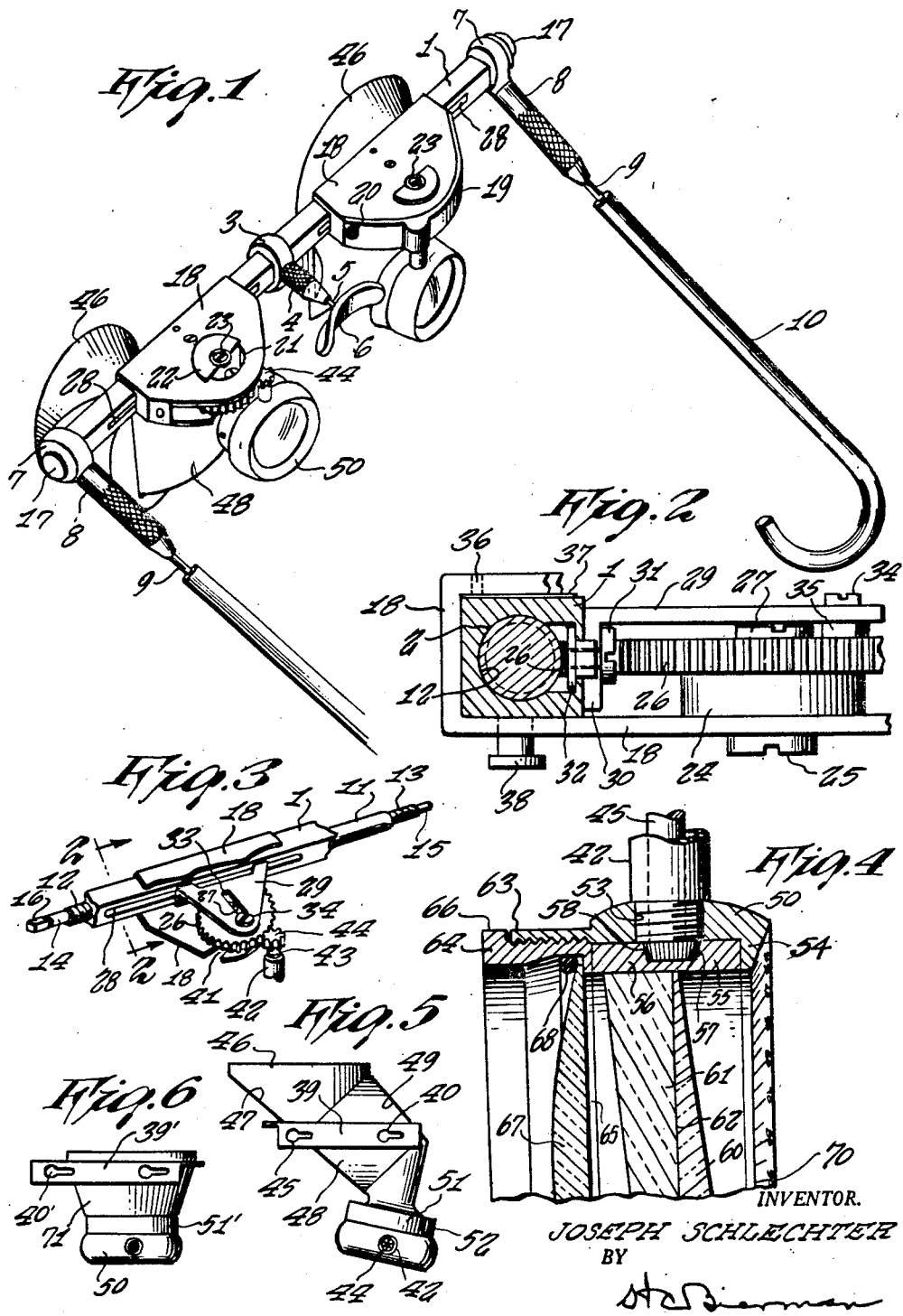
INVENTOR.
JOSEPH SHLECHTER
BY
ATTORNEY

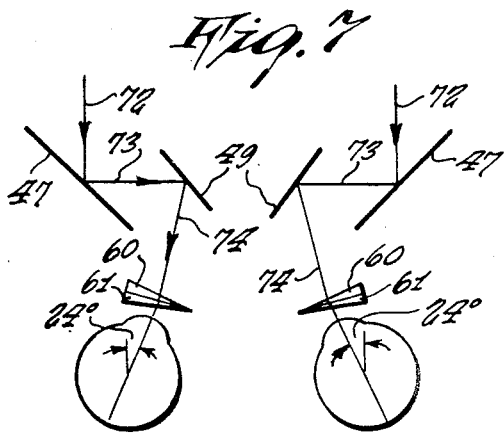
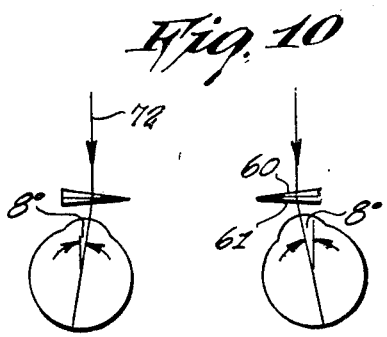
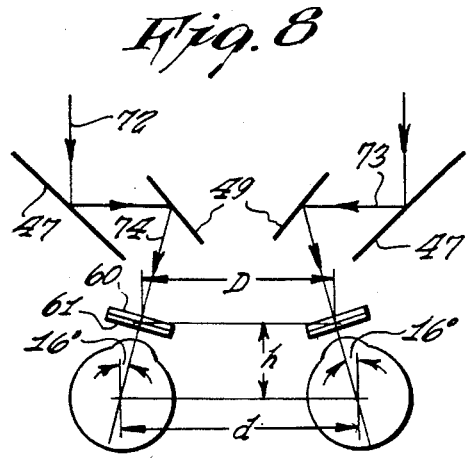
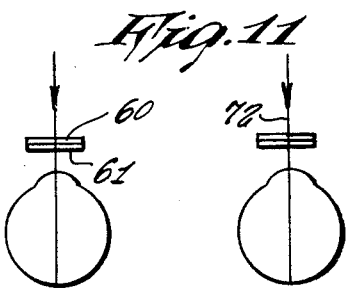
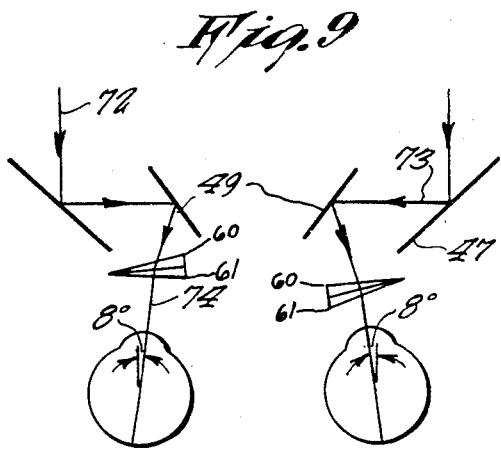
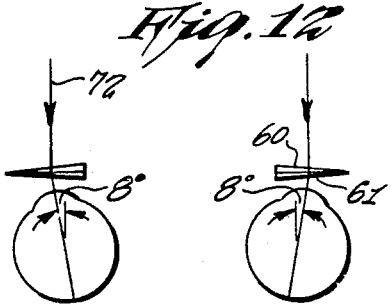

United States Patent Office 2,817,332
Patented Dec. 24, 1957

2,817,332

ORTHOPTIC SPECTACLES

Joseph Shlechter, Haifa, Israel

Application May 10, 1955, Serial No. 507,403

13 Claims. (Cl. 128—76.5)

The present invention is directed to an apparatus for the treatment of the eyes, more particularly for the purpose of straightening strabism of convergent and of divergent nature.

In many cases the eyes of a child or other person are defective in that the muscles of one eye are stronger or weaker than those of the other eye, causing the eyes to be misalined. In some persons only one of the eyes may be out of the normal, and in others both eyes may be out of the normal. Where the misalinement is of minor character, it may be corrected by properly fitted lenses, but where the defect is of a serious character, surgery has been resorted to. But this is a difficult and delicate operation and it is not always successful.

This invention is intended and adapted to overcome the difficulties set forth above, it being among the objects thereof to provide an apparatus which is of the nature of orthoptic spectacles which may be adjusted and manipulated so as to correct said defects without undue discomfort to the patient.

It is also among the objects of the present invention to provide an apparatus of the character indicated above, which is capable of correcting unequal defects in a pair of eyes and also correct cases of divergence as well as of convergence of a pair of eyes.

It is further among the objects of the invention to provide an apparatus which is so adjustable as to be adapted to be applied to a large variety of sizes, shapes and characters of faces.

In the practice of the invention, there is provided a pair of spectacle frames having a nose piece and ear piece which are adjustable to fit practically all faces. A pair of casings carrying the corrective elements are mounted on the cross-bar for adjustment to the location of the eyes of the patient. The mechanism is essentially a pair of prisms in each side of the device and attached to the casing, the prisms being rotatable relative to each other so as to alter the direction of the beams of light entering the apparatus by changing the degree of refraction. As a part of the combination there is attached a pair of mirrors for each side, the mirrors being at a small angle to each other, to enable squints of larger angles to be straightened.

By the use of the present device, the patient may wear it for several hours a day, whereas by prior methods such a long period of time during a day could not be tolerated. Due to the present invention, the squint is gradually diminished, day by day, by rotation of a shaft at the time the patient wears the device and attempts to focus the eyes to see single objects. If the strabism is of a convergent nature, it is gradually brought to a partial divergence for a certain period of time, and if the strabism is of a divergent nature it is gradually brought to a partial convergence for a certain period of time, after which the patient will be able to see normally without the use of the device.

In the accompanying drawing constituting a part hereof and in which like reference characters indicate like parts, Fig. 1 is a perspective view of an apparatus made in accordance with the present invention;

Fig. 2 is an enlarged transverse cross-sectional view taken through one of the casings and showing an arrangement of gears;

Fig. 3 is a perspective view of the mounting of said gearing, some parts being broken away for clearness;

Fig. 4 is an enlarged vertical cross-sectional view of the prism assembly;

Fig. 5 is a top plan view showing the mirror arrangement;

Fig. 6 is a view similar to Fig. 5 of a modification wherein the mirrors are omitted, and Figs. 7–12 are diagrammatic views showing various positions of the prisms and mirrors at the several stages of the treatment of a patient.

There is provided an angular hollow bar 1 having a central longitudinal bore 2. A split collar 3 mounted on a ring on the central portion of bar 1 has a threaded split extension on which is threaded a lug 4. The extension is hollow and pin 5 extending from nose piece 6 enters the hollow portion. By this arrangement collar 3 may be shifted laterally and nose piece 6 may be extended so as to fit the individual to be treated.

On the ends of bar 1 on rings are mounted split collars 7 having threaded split extensions on which are threaded lugs 8. The extensions are hollow and the ends 9 of the bow portions or ear pieces of the spectacles are inserted into said hollows, threaded lug 8 being rotated in order to tighten the ear pieces in adjusted positions and the collars around the rings. The ear pieces may be coated with a suitable plastic material 10.

In the central opening of bar 1 is a rod 11 having its ends 12 and 13 threaded. End 12 is provided with left hand threads and end 13 is provided with right hand threads (only a portion of thread 13 is shown). Beyond the threaded portions are reduced circular ends 14 and 15, and the extreme ends 16 are angular so as to accommodate a key for turning rod 11. The circular ends 14 and 15 rest in bearings (not shown) screwed-in in both ends of bar 1 to prevent friction of rod 11 when rotated and also to prevent it from longitudinal movement. Hollow caps 17 threaded into the ends of bar 1 cover portions 16 and prevent accidental turning of rod 11.

A pair of casings 18 are mounted on bar 1 and contain the mechanism for correcting the eyesight. Each of the casings has a cover 19 held by set screws 20. On top of each casing is an opening 21 adapted to be closed by a semicircular plate 22 pivoted at 23. As shown in Fig. 1, the plate at the left is in open position and the plate at the right is in closed position. On the bottom of each casing 18 is a washer 24 fixed in position by a hollow set screw 25 threaded in the central opening of the washer. A gear 26 rests on washer 24 and is held in position by headed pin 27 which is threaded into the hollow portion of set screw 25. Gear 26 is adapted to rotate around pin 27 as a pivot.

Bar 1 has a pair of spaced longitudinal slots 28 adjacent to gears 26, the teeth of said gears entering said slots and meshing with threads 12 and 13 of rod 11, constituting a worm-and-gear arrangement. Triangular plates 29 have angular sides 30 adjacent to slots 28. Screws 31 passing through openings in sides 30 and through slots 28, are threaded into nuts 32, whereby the triangular plates are held in fixed positions on bar 1. Slots 33 are provided in plates 29, said slots being transverse to the axis of bar 1. A screw 34 passing through slot 33 is anchored in gear 26 eccentrically and a washer 35 is interposed around screw 34 between plate 29 and gear 26 to prevent the plate from bending onto screw 27. A pin 36 mounted in the top of casing 18 has a flat spring 37 attached to its lower end, the tension of said spring serving to maintain casing 18 rigid and for easy sliding.

At the underside of each casing 18 is a pair of rivets 38 (only one of which is shown). Plate 39 has a pair of keyhole slots 40 which are adapted to be fitted over rivets 38 to lock the optical system in position. In the front of the lower part of casing 18 are a pair of symmetrically placed cutouts 41 (only the left hand cutout being clearly visible in Fig. 3). A vertical sleeve 42 has a groove 43 which is fitted into the right hand cutout 41. A pinion 44 mounted on a shaft 45 meshes with gear 26.

The optical system for each of the eye pieces consists of an open-ended box-like structure 46 into which the light enters. It then impinges on mirror 47 and enters central portion 48 of the optical system. Another mirror 49 in the central portion reflects the light into the lens arrangement contained in retainer 50 which is slipped into ring 51 of portion 48 and held in place by oppositely positioned set screws 52. Mirrors 47 and 49 are non-parallel.

As shown in Fig. 4, the prism housing or retainer 50 consists of a circular shell having a threaded opening 53 in the upper part into which the lower end of sleeve 42 is threaded. Within shoulder 54 of housing 50 is a ring 55 and adjacent thereto is a second ring 56 of the same dimensions. The rings have recesses which face each other and gear teeth 57 and 58, respectively are formed in the vertical walls thereof. The lower end of shaft 45 has a cone gear fitting into said recesses and meshing with gears 57 and 58 simultaneously. Fixed in ring 55 is circular prism 60 and fixed in ring 56 is circular prism 61, the faces 62 of said prisms being substantially close to each other but so as not to interfere with the relative rotation thereof.

Housing 50 has an angular extension 63 which is internally threaded. An externally threaded retainer ring 64 has an angular flange 65 practically in contact with the left hand edge of ring 56, serving to retain both rings 55 and 56 in operative relation with the other elements of the structure. The outer face 66 of ring 64 has a pair of threaded openings (not shown) for the reception of set screws 52 as shown in Fig. 5. In ring 64 adjacent to flange 65 is a prescription lens or lenses 67, if necessary or desired, said lens being held in place by a spring wire 68 or other suitable means. The front face of housing 50 at shoulder 54 is calibrated in degrees, having 0° at the top 69 and being calibrated both to the right and left to 90° as shown at 70.

When it is unnecessary to provide mirrors 47 and 49, the attachment of Fig. 5 is removed and that of Fig. 6 is inserted in its place. It has a conical cylinder 71 having plate 39' with its keyhole slots 40' fitted over rivets 38. It has ring 51', into which the extended portion of housing 50 is fitted and held by set screws.

The principle of the operation of the device is illustrated in Figs. 7–12, which illustrate a combination system involving up to a 48° of squint of one eye or a 24° of squint of each eye to be straightened.

In Fig. 7, parallel rays of light 72 fall on mirrors 47, are reflected at 73 onto mirrors 49. Since the mirrors are not parallel but are at an angle of 8° to each other, the reflected rays from mirror 49 are at an angle of 16° with respect to the incoming rays 72. The light then passes through the pairs of prisms 60—61 where each prism has a refracting angle of 8° and an index of refraction $n=1.5$. Being in this position at the maximum refracting angle of $8°+8°=16°$, the pairs of prisms 60—61 again deviate the rays of light by an additional 8° over that previously deviated by the mirrors, i. e. $16°+8°=24°$ for each eye.

By gradually rotating prisms 60 and 61 relative to each other in opposite directions during a specified period of time, which differs with and depends upon the individual patient, the squint is gradually diminished. During such adjustment the distance between the right and left eye pieces is increased. In Fig. 8 the prisms have been rotated to the extent that they are now in a neutral position, causing no refraction. However, the rays reaching the eyes are at an angle of 16° with the incoming rays 72, said deviation being caused only by mirrors 47 and 49.

Fig. 9 shows the prisms 60—61 in the extreme opposite position from that shown in Fig. 7, thus diminishing by 8° the deviation caused by the mirrors, causing each eye to squint 8° $(16°-8°=8°)$. Fig. 10 shows the prisms brought back to the extreme position of Fig. 7, but the mirrors have been removed, since the maximum refracting angle of the prisms is the same as the angle of the squint of the eyes, namely, 8°.

Fig. 11 shows prisms 60—61 in a neutral position and the eyes looking straight forward, which is the normal. However, the muscles of the eyes are strained, having a tendency to turn back the eyeballs to a certain degree. To overcome this, it becomes necessary to over-correct and to bring the eyeballs from the straight position to a divergent position as shown in Fig. 12. Thereafter a pair of conventional spectacles with single prismatic lenses of a refracting angle of about 10° should be worn by the patient for a few months to maintain the muscles in the positions described above. Then the spectacles are removed and the patient looks straight, the muscles having been set to accomplish the result.

The operation of the device is as follows:

The optometrist first determines the angle of squint and the distance between the eyeballs of the patient. Rod 11 is turned in order to bring the mark on outer ring 55 opposite 0° at point 69. The prisms 60 and 61 are then in the neutral position. Screws 23 are then loosened and the discs 22 are turned to expose opening 21 to obtain access to screws 34, which should be so tightened that they do not slide in slots 33. Screws 20 are removed and covers 19 are taken off of casings 18, and screws 31 are carefully loosened. One of the hollow caps 17 is removed and rod 11 is turned by a key placed on angular end 16, gear wheel 26 remaining fixed. As a result, prisms 60—61 will also be fixed and both casings 18 will move towards the center or outwardly depending on the direction of rotation of rod 11.

The casings are brought up to a distance shown on the surface opposite the slotted surface 28. This distance can be calculated as follows: In Fig. 8, D shows the distance required, which is obtained by the use of the formula $$D=d-2h.\tan 16°=d-2h\times 0.287$$

$D=d-0.57h$ where $d$ is the distance between the eyeballs' centers and $h$ is the distance between the imaginary lines connecting the centers of the eyeballs and centers of the prisms. Since $h$ will generally be in the order of 16 millimeters, then $D=d-0.574\times 16=d-9.2$.

Screws 31 which secure triangular plates 29 are tightened; screws 34 are loosened, covers 19 are attached and fastened by screws 20, and discs 22 close openings 21 and are fastened by screws 23. Bows 10 and nose piece 6 are adjusted to fit the patient. If the squint of the patient is between 16° and 24°, rod 11 is turned in the proper direction as to bring the marks on the outer rings 55 inwards until the patient starts to see single objects with both eyes. They will approach the position shown in Fig. 7.

If, however, the squint is of a divergent nature, screws 20 and covers 19 are removed. The optical units of Fig. 5 are removed together with housings 50, and the two units are interchanged in their positions on rod 1. Groove 43 of sleeve 42 must be fitted into the outer cutouts 41. The teeth of small gear 44 are carefully meshed with the teeth of gear 26. Covers 19 are replaced and fastened in position by screws 20.

To remove the mirrors from the assembly and use the apparatus as shown in Figs. 10, 11 and 12, the optical units in their housings 50 are taken out of rings 51 by loosening set screws 52. Then they are inserted into rings 51' of Fig. 6 having attached thereto conical tubes 71, and they are secured in place by screws. The assembly of Fig. 6 is attached to rivets 38 instead of the mirror assembly of Fig. 5. The marks on outer rings 55 are adjusted to coincide with 0° at point 69 of Fig. 4. The distance between the centers of prisms 60—61 which is read on bar 1, should by neutral position of the prisms, show the same distance as between the centers of the eyeballs.

I claim:

1. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other.

2. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other, a bar constituting part of said frame, said casing being mounted on said bar for adjustment longitudinally thereof.

3. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other, a bar constituting part of said frame, said casing being mounted on said bar for adjustment longitudinally thereof, said bar being hollow, a threaded rod in said bar and operatively connected to said prism rotating means.

4. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other, a bar constituting part of said frame, said casing being mounted on said bar for adjustment longitudinally thereof, said bar being hollow, a threaded rod in said bar and operatively connected to said prism rotating means, the threads of said bar meshing with a gear mounted in said casing.

5. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other, a bar constituting part of said frame, said casing being mounted on said bar for adjustment longitudinally thereof, said bar being hollow, threaded rod in said bar and operatively connected to said prism rotating means, the threads of said bar meshing with a gear mounted in said casing, and means at the end of said bar for rotating the same.

6. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other, a bar constituting part of said frame, said casing being mounted on said bar for adjustment longitudinally thereof, said bar being hollow, a threaded rod in said bar and operatively connected to said prism rotating means, the threads of said bar meshing with a gear mounted in said casing, a pinion meshing with said gear and connected to said prisms.

7. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other, a bar constituting part of said frame, said casing being mounted on said bar for adjustment longitudinally thereof, said bar being hollow, a threaded rod in said bar and operatively connected to said prism rotating means, the threads of said bar meshing with a gear mounted in said casing, a pinion meshing with said gear and connected to said prisms including toothed rings in which said prisms are mounted and a gear connected with said pinion and meshing with said toothed rings.

8. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other, a box, means for attaching said box to said casing, said housing being attached to said box, and mirrors in said box, said mirrors being in staggered relation and at a small angle to each other.

9. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other, a bar constituting part of said frame, said casing being mounted on said bar for adjustment longitudinally thereof, said bar being hollow, a threaded rod in said bar and operatively connected to said prism rotating means, the threads of said bar meshing with a gear mounted in said casing, a longitudinal slot in said bar, said gear entering said slot.

10. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other, said casing being adjustable along said frame.

11. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other, a bar constituting part of said frame, said casing being mounted on said bar for adjustment longitudinally thereof, said bar being hollow, a threaded rod in said bar and operatively connected to said prism rotating means, the threads of said bar meshing with a gear mounted in said casing, a pinion meshing with said gear and connected to said prisms through a shaft.

12. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other, a bar constituting part of said frame, said casing being mounted on said bar for adjustment longitudinally thereof, said bar being hollow, a threaded rod in said bar and operatively connected to said prism rotating means, the threads of said bar meshing with a gear mounted in said casing, a pinion meshing with said gear and connected to said prisms through a shaft, a sleeve surrounding said shaft, a groove in said sleeve, a cut-out in said casing into which said groove is fitted.

13. Orthoptic spectacles comprising a frame adapted to be set on the face of the wearer, a pair of corrective elements mounted on said frame in operative position with the eyes, a casing for each of said elements, a housing on each said casing, said corrective elements comprising a pair of prisms in each said housing, means for rotating said prisms relatively to each other, an extension on said housing, a lens mounted in said extension.

References Cited in the file of this patent

UNITED STATES PATENTS

| | | |
|---|---|---|
| 686,616 | Johnquest | Nov. 12, 1901 |
| 770,645 | Lundgren | Sept. 20, 1904 |
| 1,543,188 | Poser | June 23, 1925 |
| 2,186,418 | Mandaville | Jan. 9, 1940 |